(12) United States Patent
Hiyoshi

(10) Patent No.: US 9,592,459 B2
(45) Date of Patent: Mar. 14, 2017

(54) OIL FILTER

(75) Inventor: Masatoshi Hiyoshi, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 298 days.

(21) Appl. No.: 14/344,142

(22) PCT Filed: Sep. 10, 2012

(86) PCT No.: PCT/IB2012/001735
§ 371 (c)(1),
(2), (4) Date: Mar. 11, 2014

(87) PCT Pub. No.: WO2013/038247
PCT Pub. Date: Mar. 21, 2013

(65) Prior Publication Data
US 2014/0339144 A1    Nov. 20, 2014

(30) Foreign Application Priority Data
Sep. 12, 2011    (JP) ................................. 2011-198290

(51) Int. Cl.
   *B01D 29/96*    (2006.01)
   *B01D 35/30*    (2006.01)

(52) U.S. Cl.
CPC ............. *B01D 29/96* (2013.01); *B01D 35/30* (2013.01); *B01D 2201/34* (2013.01); *B01D 2201/4046* (2013.01)

(58) Field of Classification Search
CPC ................ B01D 35/30; B01D 2201/34; B01D 2201/4046; B01D 29/96
USPC ... 210/232, 435, 443, 440, DIG. 17, 167.02, 210/450
See application file for complete search history.

(56) References Cited

U.S. PATENT DOCUMENTS 7,150,828 B2 * 12/2006 Sakata ................. B01D 35/153
                                           184/1.5
2005/0077253 A1    4/2005    Sugiura et al.
2007/0034631 A1    2/2007    Minowa et al.
(Continued)

FOREIGN PATENT DOCUMENTS

CN              1605721 A      4/2005
JP             2000-153112 A      6/2000
(Continued)

*Primary Examiner* — Madeline Gonzalez
(74) *Attorney, Agent, or Firm* — Sughrue Mion, PLLC

(57) ABSTRACT

An oil filter includes a casing (2) having a cylinder portion formed with an opening in one end thereof and a threaded portion formed on an inner peripheral surface of the cylinder portion, and a cap (6) threadably engaging with the threaded portion to contain a filter element between the casing (2) and the cap (6). The cap (6) includes a flange abutted on an open end surface of the cylinder portion of the casing (2) and allowing the cap (6) to be positioned by the casing (2), and a recess fittably receiving a sealing member for obstructing oil flow between the cap (6) and the casing (2). The cap (6) is formed with a facilitating portion that allows at least a part of the sealing member to move onto a radial end surface of the flange when the sealing member is mounted on an outer peripheral surface of the cap (6) at a place between the flange and the recess and the cap (6) is positioned by the casing (2).

8 Claims, 7 Drawing Sheets

(56) References Cited

U.S. PATENT DOCUMENTS

2012/0037557 A1* 2/2012 Atteberry .............. B01D 27/08
  210/234

FOREIGN PATENT DOCUMENTS

| JP | 2005-180387 A | 7/2005 |
| JP | 2007-046522 A | 2/2007 |

* cited by examiner

FIG. 4A
FIG. 4B
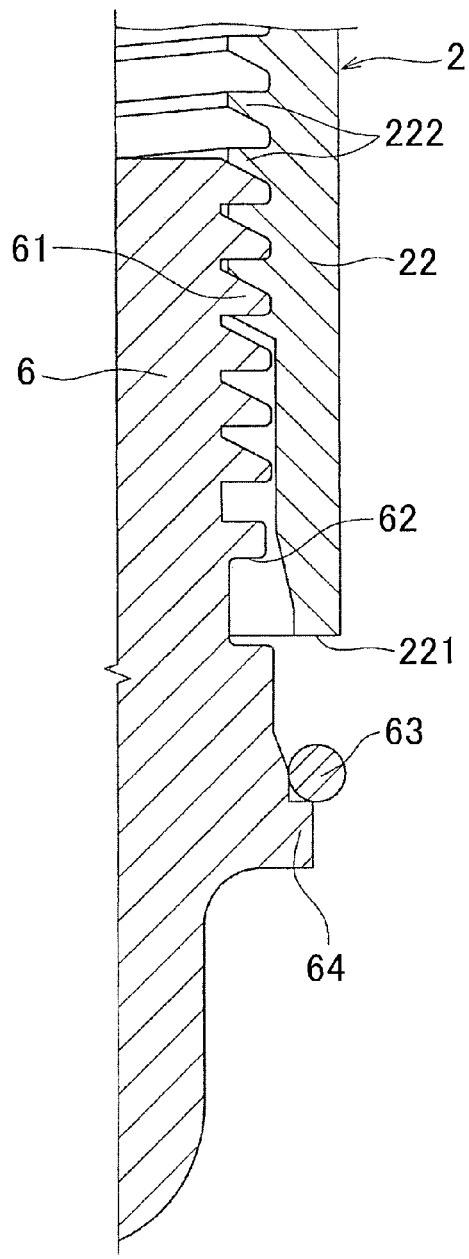
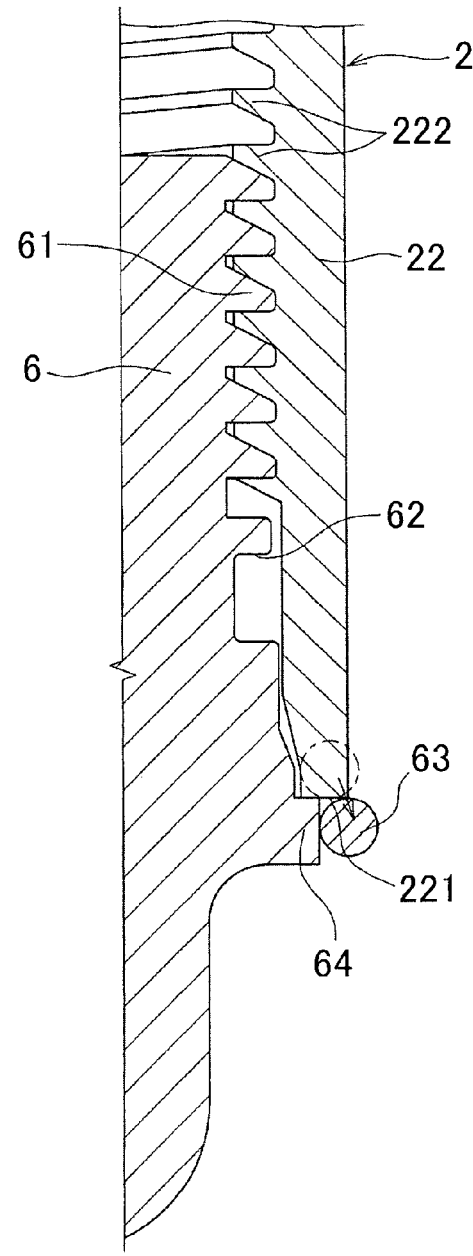

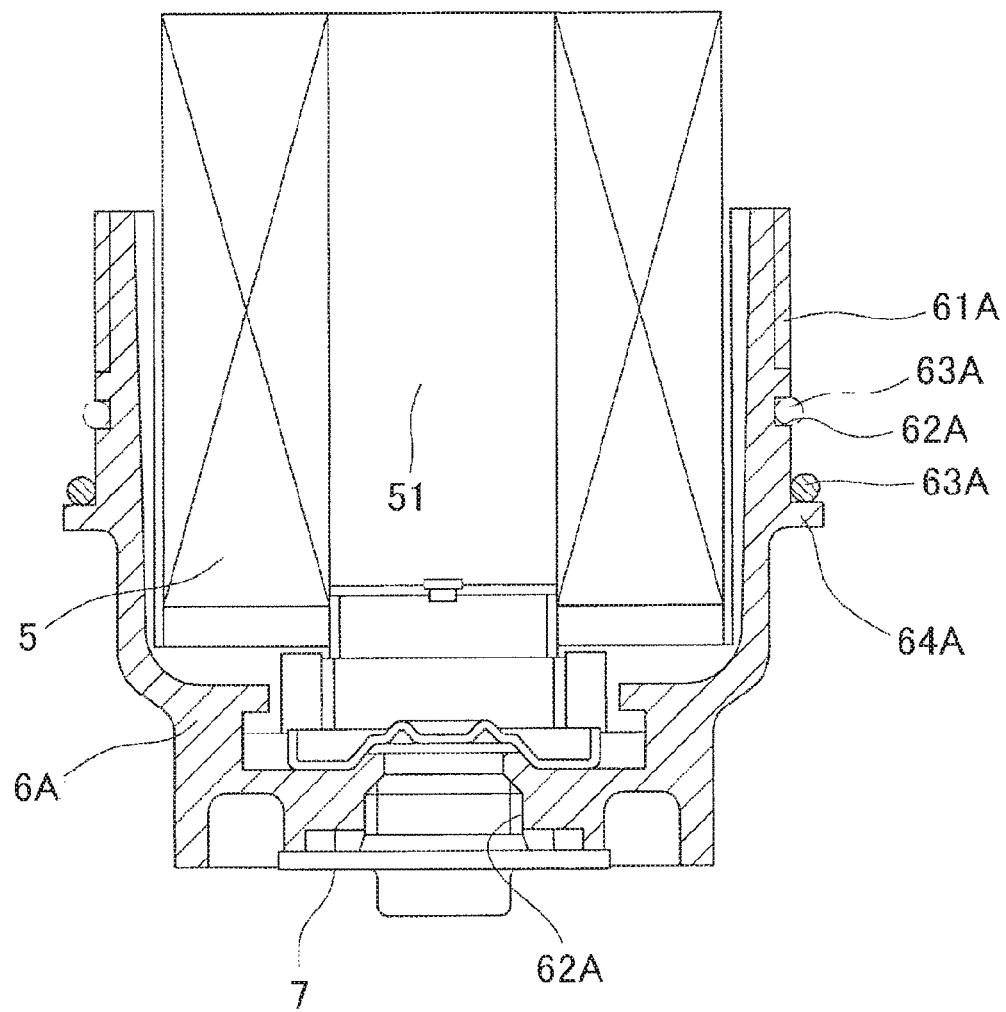

OIL FILTER

BACKGROUND OF THE INVENTION

1. Field of the Invention

The present invention relates to an oil filer that includes a casing having a cylinder portion formed with an opening in one end thereof and a threaded portion formed on an inner peripheral surface of the cylinder portion, and a cap threadably engaging with the threaded portion so as to contain a filter element between the cap and the casing. Particularly, the invention relates to an oil filter mounted in a vehicle and filtering out foreign substances from oil lubricating an internal combustion engine.

2. Description of Related Art

There is known the oil filter that is mounted in the vehicle and filters out the foreign substances from the oil lubricating the internal combustion engine. There have been also proposed a variety of oil filters designed to allow for replacement of the filter element.

For example, an oil filter is disclosed in which a male thread formed on an outer peripheral surface of an cylindrical cap is screwed in a female thread formed on an inner peripheral surface of a case whereby the cap is fixed to the case (see Japanese Patent Application Publication No. 2005-180387 (JP 2005-180387 A)). In this oil filter, a gap between the case and the cap is sealed by fitting an O-ring in a mating recess formed in the cap.

However, the oil filter disclosed in the above JP 2005-180387 A has possibility that the O-ring may be erroneously mounted on the cap at a place adjoining a case-side of a flange, to which an open end of the case is abuttedly locked.

The O-ring should essentially be fitted in the mating recess formed in the cap. Even in a case where the O-ring is erroneously mounted on the cap at the place adjoining the case-side of the flange of the cap; however, the oil is sealed to some extent by the O-ring clamped between the open end of the case and the flange of the cap. In this case, an operating personnel may stay unaware of the erroneous mounting of the O-ring because the erroneously mounted O-ring is clamped between the flange of the cap and the open end of the case.

SUMMARY OF THE INVENTION

The invention provides an oil filter adapted to prevent erroneous mounting of a sealing member such as O-ring.

An oil filter according to the invention is constructed as follows.

According to an aspect of the invention, an oil filter includes: a casing including a cylinder portion formed with an opening in one end of the casing, and a threaded portion formed on an inner peripheral surface of the cylinder portion; and a cap threadably engaging with the threaded portion and containing a filter element between the casing and the cap. The cap includes: a flange abutted on an open end surface of the cylinder portion of the casing and allowing the cap to be positioned by the casing; and a recess fittably receiving a sealing member for obstructing oil flow between the cap and the casing. The cap is formed with a facilitating portion that allows at least a part, of the sealing member to move onto a radial end surface of the flange when the sealing member is mounted on an outer peripheral surface of the cap at a place between the flange and the recess and the cap is positioned by the casing.

The oil filter having the above construction has the following effect. In a case where the sealing member such as an O-ring is erroneously mounted on the outer peripheral surface of the cap at a place adjoining the recess-side of the flange rather than in the recess, the open end surface of the cylinder portion of the casing pressingly expands the sealing member outward beyond the flange when the cap is threadably engaged with the threaded portion of the casing and screwed into the casing. Therefore, the operating personnel can readily be aware of the erroneous mounting of the O-ring, and hence the erroneous mounting of the sealing member such as the O-ring can be prevented.

Specifically, a projection is formed on the outer peripheral surface of the cap in a region between the flange and the recess and is unitarily formed with the side surface of the flange which adjoins the recess. Therefore, in a case where the sealing member is erroneously mounted on the outer peripheral surface of the cap at the place adjoining the recess-side of the flange, the open end surface of the cylinder portion of the casing presses the sealing member toward the flange while the projection pressingly expands the sealing member toward the outer periphery of the cap and then outward beyond the flange when the cap is threadably engaged with the threaded portion of the casing and is screwed into the casing. This makes the operating personnel readily be aware of the erroneous mounting of the sealing member such as the O-ring. Hence, the erroneous mounting of the sealing member such as the O-ring can be prevented.

Further, the facilitating portion is formed at least a circumferential part of the flange. Therefore, in a case where the sealing member is erroneously mounted on the outer peripheral surface of the cap at the place adjoining the recess-side of the flange, the open end surface of the cylinder portion of the casing presses the sealing member toward the flange and the facilitating portion pressingly expands the sealing member outward beyond the flange when the cap is threadably engaged with the threaded portion of the casing and screwed into the casing. This makes the operating personnel readily be aware of the erroneous mounting of the sealing member such as the O-ring. Hence, the erroneous mounting of the sealing member such as the O-ring can be prevented.

In the oil filter, the facilitating portion may be a projection that is formed on the outer peripheral surface of the cap at the place between the flange and the recess and is unitarily formed with a surface of the flange which adjoins the recess.

In the oil filter, the facilitating portion may be at least a part of the flange that is formed in a radial length along which the movement of the sealing member is facilitated.

In the oil filter, the facilitating portions may be formed at a plurality of circumferential places in substantially symmetrical relation with respect to the center axis of the oil filter.

The oil filter having the above construction has the following effect because of the facilitating portions formed at the plurality of circumferential places in substantially symmetrical relation with respect to the center axis of the oil filter. When the cap is threadably engaged with the threaded portion of the casing and screwed into the casing, the force is applied between the open end surface of the cylinder portion of the casing and the flange substantially symmetrically with respect to the center axis of oil filter. This permits the cap to be smoothly screwed into the casing.

In the oil filter, the facilitating portion may be formed by forming a flat surface parallel to the center axis of the oil filter on an outside surface of the flange in the radial direction of the cap.

The oil filter having the above construction has the following effect. Since the facilitating portion is formed in a mode such that the flange is cut on a plane parallel to the center axis of the oil filter (mode where the plane parallel to the center axis of the oil filter is formed on the outside surface of the flange in the radial direction of the cap), the facilitating portion can be formed in a simple structure.

In the oil filter, a projection that is formed on the outer peripheral surface of the cap at the place between the flange and the recess and is unitarily formed with a surface of the flange which adjoins the recess may be a first facilitating portion of the facilitating portion; at least a part of the flange that is formed in a radial length along which the movement of the sealing member is facilitated may be a second facilitating portion of the facilitating portion; and the first facilitating portion may be formed at a position substantially the same as the second facilitating portion in the circumferential direction of the flange.

The oil filter having the above construction has the following effect. Since the first facilitating portion (the projection) is formed at a position substantially the same as the second facilitating portion in the circumferential direction of the flange, the sealing member is pressed toward the outer periphery of the cap by the first facilitating portion and is pressingly expanded outward beyond the flange at the second facilitating portion when the cap is threadably engaged with the threaded portion of the casing and screwed into the casing. This makes the operating personnel more readily be aware of the erroneous mounting of the sealing member such as the O-ring. This ensures that the erroneous mounting of the sealing member such as the O-ring is prevented.

The second facilitating portions may be formed at a plurality of circumferential places substantially in symmetrical relation with respect to the center axis of the oil filter.

The second facilitating portion is formed by forming a flat surface parallel to the center axis of the oil filter on an outside surface of the flange in a radial direction of the cap.

The flange and the recess may be spaced away from each other in an axial direction of the oil filter.

The oil filter according to the invention provides the following effect. In a case where the sealing member such as the O-ring is erroneously mounted on the outer peripheral surface of the cap at the place adjoining the recess-side of the flange rather than in the recess, the open end surface of the cylinder portion of the casing pressingly expands the sealing member outward beyond the flange when the cap is threadably engaged with the threaded portion of the casing and screwed into the casing. Therefore, the operating personnel can readily be aware of the erroneous mounting of the O-ring. Hence, the erroneous mounting of the sealing member such as the O-ring can be prevented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 4A and 4B are vertical sectional views showing a case where the O-ring is mounted on the cap of FIGS. 2A to 2C at an erroneous position;

FIG. 6 is a vertical sectional view showing an exemplary mounting position of the O-ring on the cap of FIGS. 5A to 5C.

DETAILED DESCRIPTION OF EMBODIMENTS

The embodiment of the invention will be described hereinbelow with reference to the accompanying drawings.

Oil Filter 100

Figure 1:
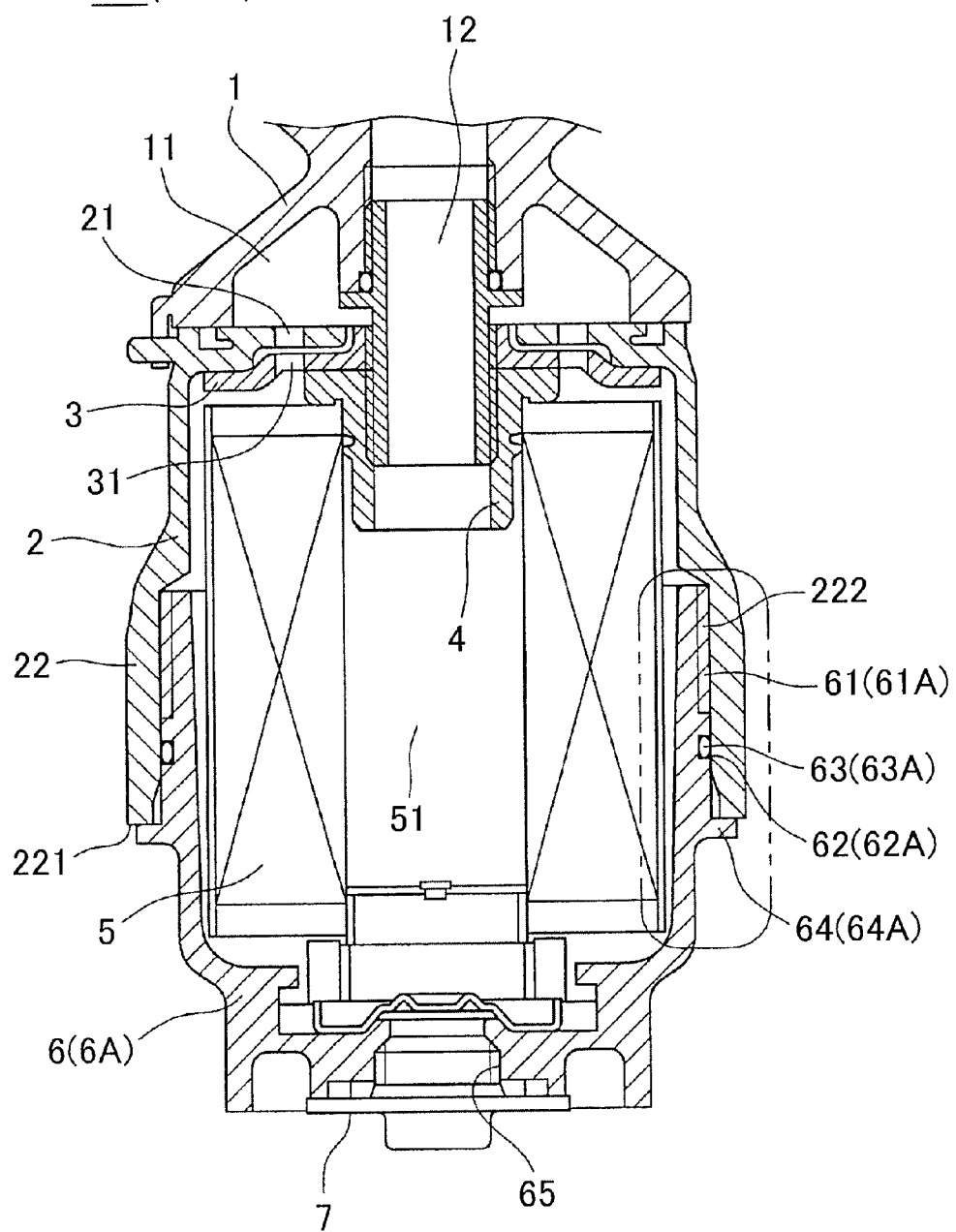
FIG. 1 is a vertical sectional view showing an exemplary oil filter according to the invention.

FIG. 1 is a vertical sectional view showing an exemplary oil filter 100 according to the invention and oil filter 100A according to a comparative example. First, a general structure of the oil filter 100 (oil filter 100A) will be described with reference to FIG. 1. The oil filter 100 includes a casing 2, a retainer plate 3, a nut member 4, a filter element 5, a cap 6, and a drain bolt 7. The oil filter 100 according to the invention differs from the oil filter 100A of the comparative example in that the oil filter 100 of the invention employs the cap 6 in place of a cap 6A of the oil filter 100A of the comparative example. Except for this, the oil filter 100 is constructed in the same manner as the oil filter 100A. The difference between the cap 6 and the cap 6A will be described hereinlater with reference to FIGS. 2A to 2C and FIGS. 5A to 5C. Now referring to FIG. 1, description is made on common components of the cap 6 and the cap 6A.

The casing 2 is assembled to a bracket 1 formed at a cylinder block of an engine. The casing is threadably engaged with the cap 6 (cap 6A) and houses the filter element 5. The bracket 1 is provided with an oil inlet port 11 and an oil outlet port 12. The oil inlet port 11 is for introducing oil from the cylinder block of the engine into the oil filter 100. The oil outlet port 12 is for delivering the oil filtered through the filter element 5 to the cylinder block of the engine. It is noted that the engine may be regarded as one example of "internal combustion engine" of the invention.

The casing 2 includes a through hole 21 and a cylinder portion 22. The through hole 21 is for delivering the oil which flows therein from the oil inlet port 11 to the filter element 5 via a through hole 31 formed in the retainer plate 3. The cylinder portion 22 is formed with an opening in one end thereof (lower end as seen in FIG. 1) and includes an end surface 221 and a female thread 222.

The end surface 221 is an open end surface of the cylinder portion 22 and is abuttedly locked to a flange 64 (flange 64A) formed on the cap 6 (cap 6A). The female thread 222 threadably engages with a male thread 61 (male thread 61A) formed on the cap 6. It is noted that the female thread 222 may be regarded as one example of "threaded portion" of the invention.

The retainer plate 3 fixes the casing 2 to the bracket 1 and includes the through hole 31. The through hole 31 allows the oil which flows therein sequentially via the oil inlet port 11 and the through hole 21 to be delivered to filter element 5.

The nut member 4 allows a top surface to press a bottom side of the retainer plate 3 upward thereby preventing the fastening of the retainer plate by the threaded portions from loosening.

The filter element 5 filters the oil delivered thereto sequentially via the oil inlet port 11, the through hole 21 and the through hole 31. In this embodiment, the filter element 5 is, formed of a filter paper, folded into a generally cylindrical configuration. Further, the filter element 5 has a through hole 51 formed at its center through which the filtered oil is delivered to the oil outlet port 12.

The cap 6 (cap 6A) is threadably engaged with the casing 2 and houses the filter element 5. The cap 6 (cap 6A) includes the male thread 61 (male thread 61A), a mating recess (recess) 62 (mating recess (recess) 62A), an O-ring 63 (O-ring 63A), the flange 64 (flange 64A) and a drain hole 65 (drain hole 65A).

The male thread 61 (male thread 61A) threadably engages with the female thread 222 formed on the cylinder portion 22 of the casing 2. The mating recess 62 (mating recess 62A) is a recess circumferentially formed on the cap at place between the male thread 61 (male thread 61A) and the flange 64 (flange 64A). The mating recess 62 (mating recess 62A) fittably receives the O-ring 63 (O-ring 63A). The O-ring 63 (O-ring 63A) obstructs (seals) the oil flow between the cap 6 (cap 6A) and the casing 2. The O-ring 63 (O-ring 63A) may be regarded as one example of "sealing member" of the invention. The flange 64 (flange 64A) is abuttedly locked to the end surface 221 of the cylinder portion 22 of the casing 2. The drain hole 65 (drain hole 65A) is a hole that is closed by threadably engaging with the drain bolt 7.

The oil from the engine flows through the oil inlet port 11 into the oil filter 100 (oil filter 100A). After passing through the through holes 21, 31 formed in the casing 2 and the retainer plate 3, the oil is filtered by the filter element 5 and again delivered to the engine via the through hole 51.

Cap 6A of Comparative Example

Figure 5A:
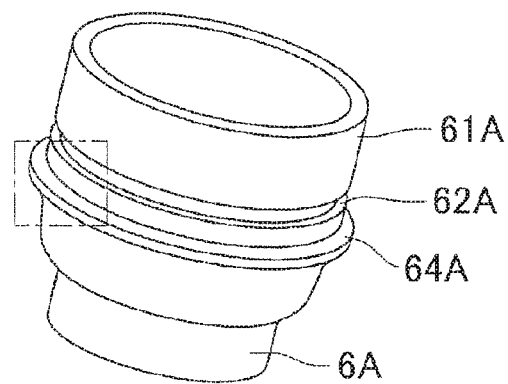
FIGS. 5A to 5C are diagrams showing an exemplary cap of an oil filter of a comparative example.
Figure 5B:
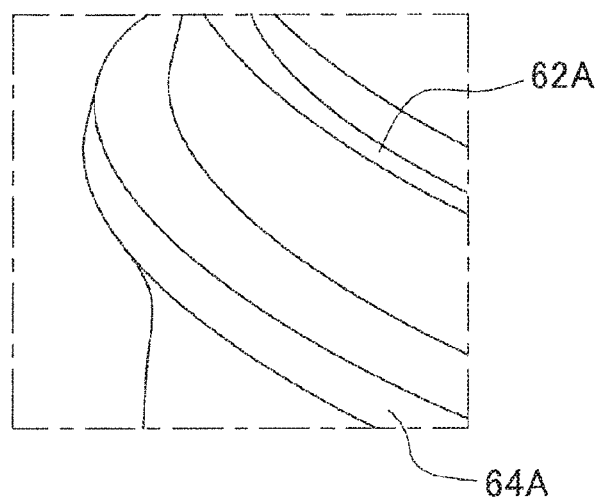
Figure 5C:
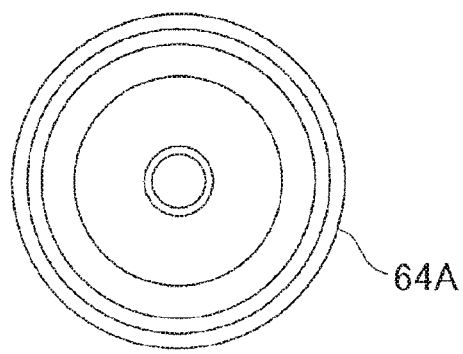

Now referring to FIGS. 5A to 5C, description is made on the cap 6A of the comparative example. FIGS. 5A to 5C are diagrams showing one example of the cap 6A of the oil filter 100A according to the comparative example. FIG. 5A is a general perspective view of the cap 6A. FIG. 5B is an enlarged perspective view of the flange 64A. FIG. 5C is a plan view of the cap 6A.

As shown in FIG. 5C, the flange 64A of the cap 6A stands from the cap at the same height along the circumference. A top surface of the flange 64A is formed into a circumferential shape in the top plan view. As shown in FIG. 5B, a side surface of the flange 64A that adjoins the mating recess 62A is formed perpendicular to an outer peripheral surface of the cap 6A that is positioned nearby.

Erroneous Mounting Position of O-Ring

Next, an erroneous mounting position of the O-ring 63A is described with reference to FIG. 6. FIG. 6 is a vertical sectional view showing an exemplary mounting position of the O-ring 63A on the cap 6A shown in FIGS. 5A to 5C. The broken line in the figure represents a normal mounting position of the O-ring 63A. The solid line represents an example of the erroneous mounting position of the O-ring 63A.

As described in the foregoing with reference to FIG. 1, the normal mounting position of the O-ring 63A is located at the position where the O-ring 63A is fittably received in the mating recess 62A. On the other hand, the erroneous mounting position of the O-ring 63A is a position, for example, on the mating recess 62A side of the flange 64A (on the surface of the flange 64A that adjoins the mating recess 62A). The following description is made on a case where the O-ring 63A (O-ring 63) is erroneously mounted at a position represented by the solid line in FIG. 6.

Erroneously Mounted O-Ring (Comparative Example)

Figure 7A:
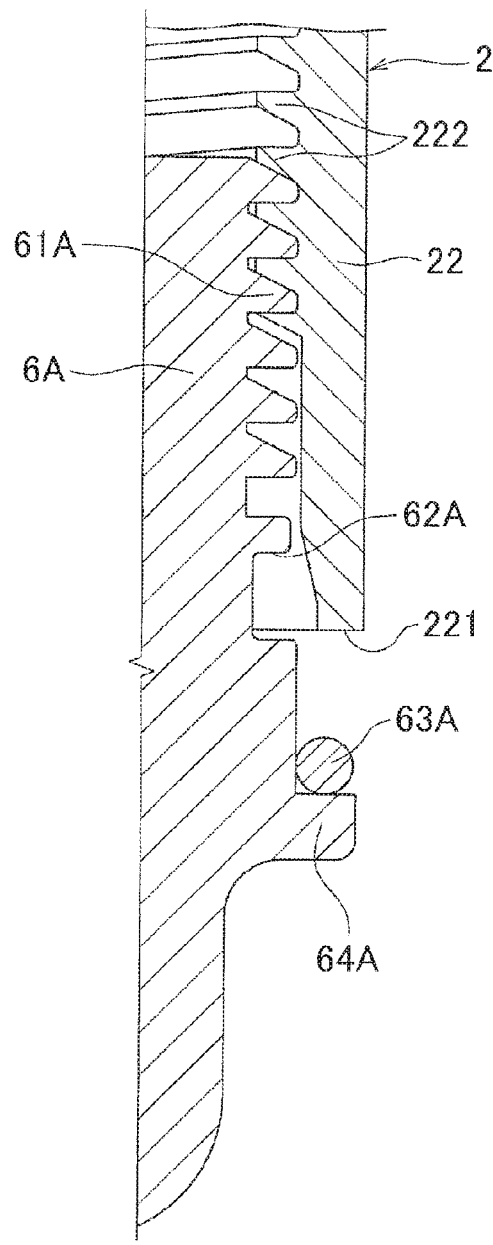
FIGS. 7A and 7B are vertical sectional views showing an exemplary case where the O-ring is mounted on the cap of FIGS. 5A to 5C at an erroneous position.
Figure 7B:
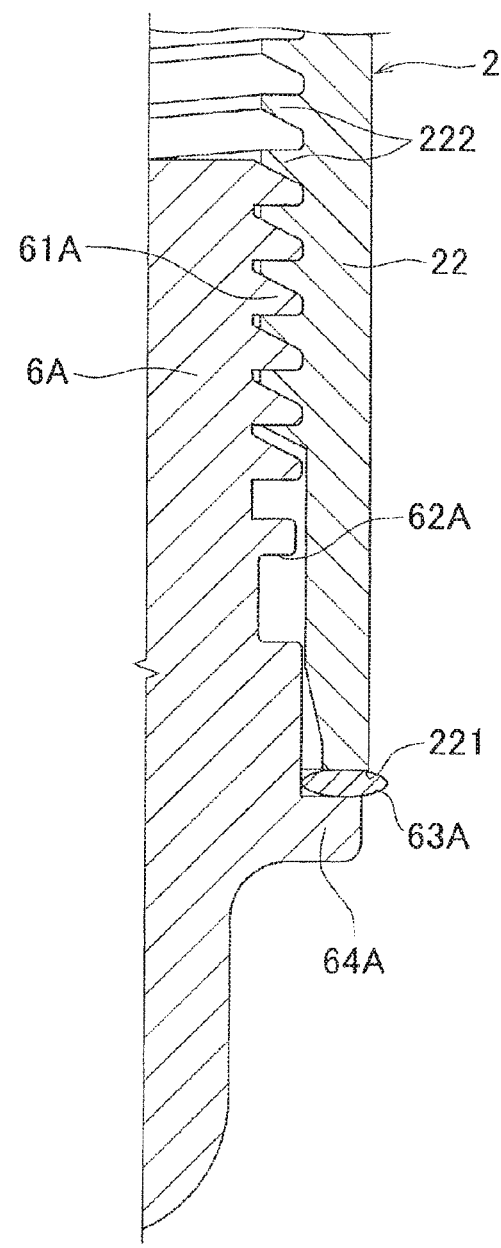

Next referring to FIGS. 7A' and 7B, description is made on a state where the cap 6A is screwed in the casing 2 of the oil filter 100A of the comparative example in a case where the O-ring 63A is erroneously mounted on the cap 6A at a position on the mating recess 62A side of the flange 64A as represented by the solid line in FIG. 6. FIGS. 7A and 7B are vertical sectional views showing an exemplary case where the O-ring 63A is mounted on the cap 6A shown in FIGS. 5A to 5C at the erroneous position.

FIG. 7A is a diagram showing a state before the cap 6A is screwed in the casing 2. FIG. 7B is a diagram showing a state after the cap 6A is screwed in the casing 2. As shown in FIG. 7A, the O-ring 63A is erroneously mounted on the cap 6A at the position on the mating recess 62A side of the flange 64A.

When the cap 6A is screwed in the casing 2, as shown in FIG. 7B, the O-ring 63A is pressed between the end surface 221 of the cylinder portion 22 of the casing 2 and the flange 64A and hence, a cross-sectional shape thereof is flattened. However, the O-ring 63A stays clamped between the end surface 221 of the cylinder portion 22 of the casing 2 and the flange 64A.

It is noted here that the operating personnel normally knows that the O-ring 63A serves to obstruct (seal) the oil flow between the cap 6A and the casing 2. However, even in the case where the O-ring 63A is erroneously mounted on the cap 6A at the position on the mating recess 62A side of the flange 64A, it is difficult for the operating personnel to be aware of the erroneously mounted O-ring 63A because the O-ring 63A stays clamped between the end surface 221 of the cylinder portion 22 of the casing 2 and the flange 64A (a so-called "area seal" is provided by the O-ring 63A).

That is, the oil filter 100A of the comparative example is capable of obstructing to some extent the oil flow between the cap 6A and the casing 2 even if the O-ring 63A is erroneously mounted on the cap 6A at the position on the mating recess 62A side of the flange 64A because the O-ring 63A stays clamped between the end surface 221 of the cylinder portion 22 of the casing 2 an the flange 64A (see FIG. 7B).

Furthermore, as shown in FIG. 7B, it is difficult for the operating personnel to be aware that he/she has erroneously mounted the O-ring 63A because the O-ring 63A seems to be normally clamped between the end surface 221 of the cylinder portion 22 of the casing 2 an the flange 64A.

Cap 6 According to the Invention

Figure 2A:
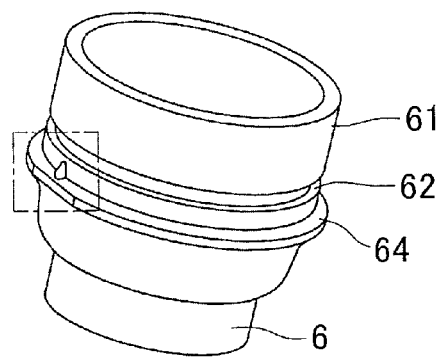
FIGS. 2A to 2C are diagrams showing exemplary cutaway portion and projection formed on a cap of FIG. 1.
Figure 2B:
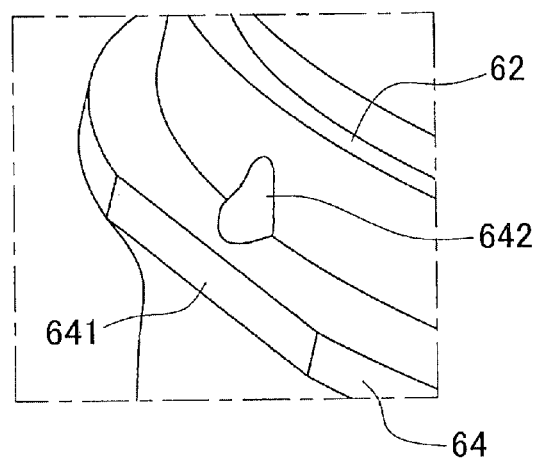
Figure 2C:
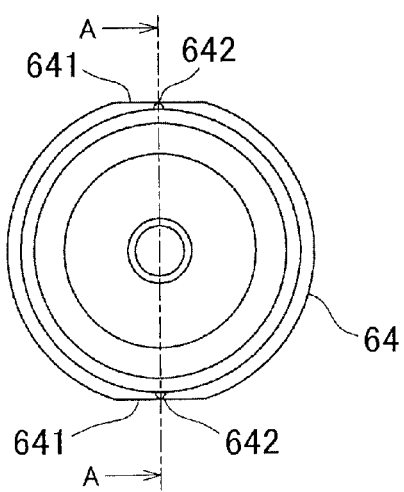

Next, description is made on the cap 6 according to the invention with reference to FIGS. 2A to 2C. FIGS. 2A to 2C are diagrams showing exemplary cutaway portion 641 and projection 642 formed on the cap 6 of FIG. 1. FIG. 2A is a general perspective view of the cap 6. FIG. 2B is an enlarged perspective view showing an area in the vicinity of the cutaway portion (facilitating portion (second facilitating portion)) 641 and the projection (facilitating portion (first facilitating portion)) 642. FIG. 2C is a top plan view of the cap 6. The cap 6 is formed with the facilitating portion that allows at least a part of the sealing member to move smoothly onto the radial end surface of the flange in a case where the O-ring 63 (sealing member) is mounted on the outer peripheral surface of the cap 6 at the place between the flange 64 and the recess and the casing is positioned by the cap.

As shown in FIG. 2C, the flange 64 of the cap 6 is formed with the cutaway portions 641 at two circumferential locations thereof which are in symmetrical relation with respect to the center axis of the oil filter 100. As shown in FIGS. 2B and 2C, the cutaway portion 641 is formed in a manner such that the flange 64 is cut on a plane parallel to the center axis of the oil filter 100.

In an area of the outer peripheral surface of the cap 6 between the flange 64 and the mating recess 62, as shown in FIG. 2B, the projection 642 is unitarily formed on the side surface of the flange 64 that adjoins the mating recess 62. Further, the projections 642 are formed at positions opposed to respective centers of the two cutaway portions 641 (The projections 642 are formed at positions on the flange 64 that correspond to the respective centers of the two cutaway portions 641). The projection 642 is formed to have a smooth curved surface and is continuous, via smooth curved surfaces, to the outer peripheral surface of the cap 6 and the side surface of the flange 64 that adjoins the mating recess 62. Furthermore, the projection 642 is configured in a manner such that the height of the projection 642 from the outer peripheral surface of the cap 6 progressively increases toward the flange 64 (as the projection 642 approaches closer toward the flange 64).

As described above, the cutaway portions 641 are formed at a plurality of circumferential places (two places in this embodiment) in the symmetrical relation with respect to the center axis of the oil filter 100. Therefore, the force is symmetrically applied between the open end surface 221 of the cylindrical portion 22 of the casing and the flange 64 with respect to the center axis of the oil filter 100 when the cap 6 in threadable engagement with the female thread 222 of the casing 2 is screwed in the casing 2. This permits the cap 6 to be smoothly screwed in the casing 2.

Although the embodiment illustrates the mode in which the cutaway portions 641 are formed at the two circumferential places, the invention includes any mode in which the cutaway portions 641 are formed at a plurality of circumferential places. In an exemplary mode, the cutaway portions 641 may be formed at three or more circumferential places.

As described above, the cutaway portion 641 is formed in the manner such that the flange 64 is cut on the plane parallel to the center axis of the oil filter 100 and hence, the cutaway portion 641 can be formed in a simple structure.

Normally Mounted O-Ring (Mode of the Invention)

Figure 3A:
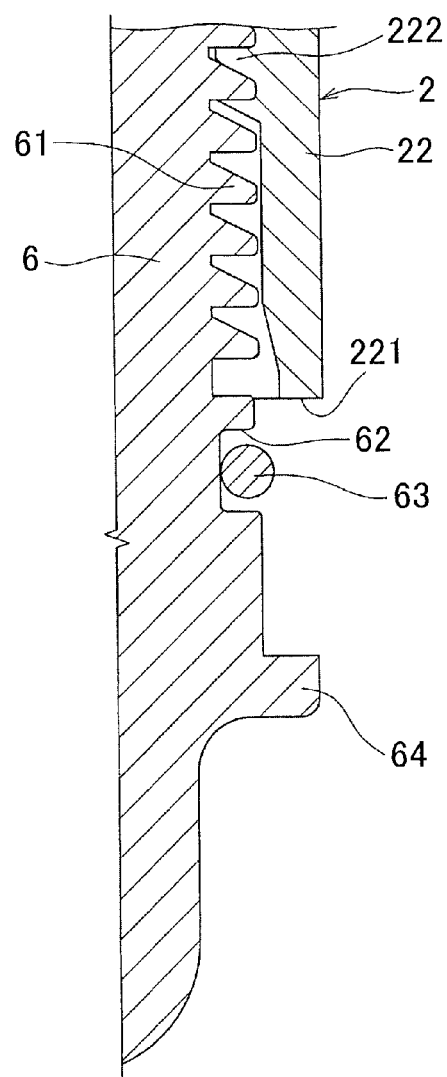
FIGS. 3A and 3B are vertical sectional views showing an exemplary case where an O-ring is mounted on the cap of FIGS. 2A to 2C at a normal position.
Figure 3B:
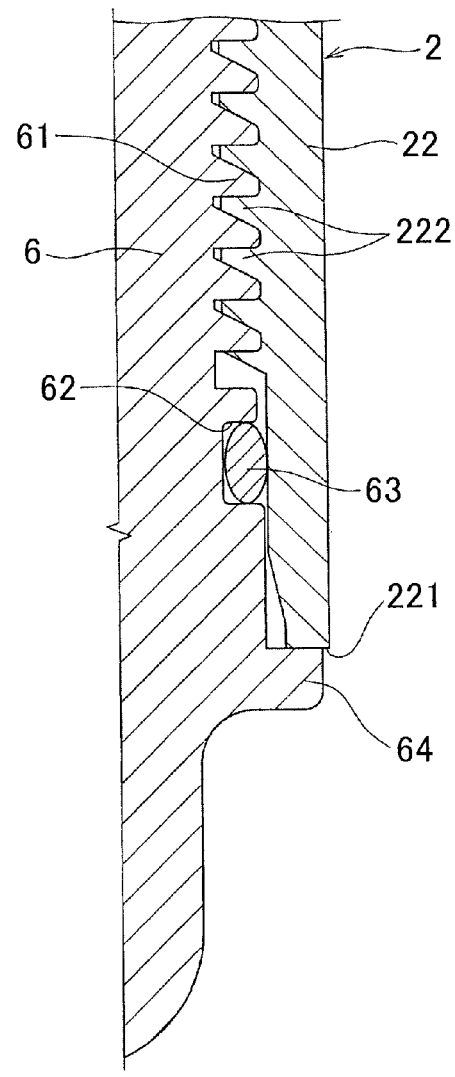

First, description is made on a case where the O-ring 63 is normally mounted in the mating recess 62, represented by the broken line in FIG. 6, of the oil filter 100 according to the embodiment of the invention. Namely, a state where the cap 6 is screwed in the casing 2 in this case is described with reference to FIGS. 3A and 3B. FIGS. 3A and 3B are vertical sectional views showing an exemplary case where the O-ring 63 is mounted on the cap 6 of FIGS. 2A to 2C at a normal position. FIG. 3A shows a state before the cap 6 is screwed in the casing 2. FIG. 3B shows a state after the cap 6 is screwed in the casing 2.

When the cap 6 is screwed in the casing 2, as shown in FIG. 3B, the O-ring 63 is depressed by an inner peripheral surface of the cylinder portion 22 of the casing 2, and is thereby flattened and totally fitted in the mating recess 62. As clamped between a bottom surface of the mating recess 62 and the opposite inner peripheral surface of the cylinder portion 22 of the casing 2, the O-ring 63 having elasticity obstructs the oil flow (so-called "axial seal" is provided by the O-ring 63).

Erroneously Mounted O-Ring (Mode of the Invention)

Next, description is made on a case where the O-ring 63 is erroneously mounted on the cap at the position adjoining the mating-recess-62 side of the flange 64, represented by the solid line in FIG. 6, of the oil filter 100 according to the invention. Namely, a state where the cap 6 is screwed in the casing 2 in this case is described with reference to FIGS. 4A and 4B.

FIGS. 4A and 4B are vertical sectional views showing an exemplary case where the O-ring 63 is mounted on the cap 6 of FIGS. 2A to 2C at the erroneous position. Specifically, FIGS. 4A and 4B are sectional views taken on the line A-A in FIG. 2C. That is, FIGS. 4A and 4B are vertical sectional views taken on a plane extending through the circumferential center positions of the cutaway portion 641 and the projection 642.

FIG. 4A shows a state before the cap 6 is screwed in the casing 2. FIG. 4B shows a state after the cap 6 is screwed in the casing 2. As shown in FIG. 4A, the O-ring 63 is erroneously mounted at the position adjoining the mating recess 62 side of the flange 64.

When the cap 6 is screwed in the casing 2 as shown in FIG. 4B, the open end surface 221 of the cylinder portion 22 of the casing 2 presses the O-ring 63 toward the flange 64 while the projection 642 pressingly expands the O-ring 63 outward of the cap 6. Further, as the cap 6 is screwed further into the casing 2, the projection 642 pressingly expands the O-ring 63 further outward of the cap 6 because the projection 642 is configured such that the height from the outer peripheral surface of the cap 6 progressively increases toward the flange 64 (as the projection 642 approaches closer toward the flange 64). When the O-ring 63 is pressed further toward the flange 64, the O-ring 63 is expanded outward beyond the cutaway portion 641 to protrude outside the flange 64. Therefore, the operating personnel can be readily aware of the erroneous mounting of the O-ring 63. This ensures the prevention of the erroneous mounting of the O-ring 63.

Furthermore, the projection 642 is formed to have the smooth curved surface and is continuous, via the smooth curved surfaces, to the outer peripheral surface of the cap 6 and the side surface of the flange 64 that adjoins the mating recess 62, as described above. Therefore, the O-ring 63 can be prevented from being damaged even in the case where the O-ring 63 is mounted on the cap 6 at the erroneous position and the cap 6 is screwed in the casing 2.

For more positive prevention of damage to the O-ring 63, it is preferred to gently incline a mating recess 62 side of the cutaway portion 641 so as to provide smooth connection between the mating recess 62 side of the cutaway portion 641 and the outer peripheral surface of the cap 6.

Although the embodiment illustrates the case where the projection 642 is formed at the place opposed to the center of the cutaway portion 641, the invention may include a mode where the projection 642 is formed along the whole circumferential area of the mating recess 62 side of the flange 64. In this case, the projection 642 can be formed in a simple structure.

As described above, the embodiment illustrates the case where the cutaway portion 641 is formed in the manner such that the flange 64 is cut on the plane parallel to the center axis of the oil filter 100. However, the cutaway portion 641 may also be formed in another mode. For example, the cutaway portion 641 may be formed by reducing the height of the flange 64 in a predetermined circumferential range thereof (for example, by reducing the height of the flange to "0" in the predetermined circumferential range thereof. Namely, the cutaway portion is not projected from the outer peripheral surface of the cap 6 but is flush with the outer peripheral surface of the cap 6).

In this case, as shown in FIG. 4B, the O-ring 63 is further expanded beyond the cutaway portions 641 of the flange 64 when the cap 6 is screwed in the casing 2. Hence, the erroneous mounting of the O-ring 63 can be assuredly prevented.

Other Embodiments

Although the embodiment illustrates the case where the cap 6 is formed with the cutaway portions 641 and the projections 642, the invention may include a mode where the cap 6 is formed with the cutaway portion 641 or the projection 642. In this case, the cap 6 has a simplified structure.

Although the embodiment illustrates the case where the sealing member is the O-ring 63, the sealing member may also be in other modes (for example, a ring-like sealing member having a rectangular cross section or the like).

Although the embodiment illustrates the case where the oil filter 100 filters out foreign substances from the oil lubricating the engine, the invention may include a mode where the oil filter 100 filters out the foreign substances from another oil (for example, an oil lubricating gears constructing a clutch).

The invention is applicable to the oil filter that includes: the casing having the cylinder portion formed with the opening in one end thereof and the threaded portion formed on the inner peripheral surface of the cylinder portion; and the cap threadably engaged with the threaded portion so as to contain the filter element between the cap and the casing. Particularly, the invention may be preferably applied to the oil filter mounted in a vehicle and filtering out foreign substances from the oil lubricating the internal combustion engine.

The invention claimed is:

1. An oil filter comprising:
a casing including a cylinder portion with an opening in one end of the casing, a threaded portion disposed on an inner peripheral surface of the cylinder portion; and
a cap threadably engaging with the threaded portion and containing a filter element between the casing and the cap,
wherein the cap includes: a flange abutted on an open end surface of the cylinder portion of the casing and allowing the cap to be positioned by the casing; and a recess fittably receiving a sealing member in a normal mounting position for obstructing oil flow between the cap and the casing, and
the cap includes at least one facilitating portion that allows at least a part of the sealing member to move onto a radial end surface of the flange when the sealing member is mounted erroneously on an outer peripheral surface of the cap at a place between the flange and the recess and the cap is positioned by the casing;
wherein the at least one facilitating portion is at least a part of the flange that is set in a radial length along which the movement of the sealing member is facilitated, and
the at least one facilitating portion comprises a projection having a smooth curved surface, the projection connects, via the smooth curved surface, an outer peripheral surface of the cap to a side surface of the flange that adjoins the recess.

2. The oil filter according to claim 1,
wherein the projection is disposed on the outer peripheral surface of the cap at the place between the flange and the recess and is unitarily disposed with a surface of the flange which adjoins the recess.

3. The oil filter according to claim 1,
wherein the at least one facilitating portion comprises a plurality of facilitating portions that are disposed at a plurality of circumferential places in substantially symmetrical relation with respect to the center axis of the oil filter.

4. The oil filter according to claim 1,
wherein the at least one facilitating portion is a flat surface parallel to the center axis of the oil filter on an outside surface of the flange in the radial direction of the cap.

5. The oil filter according to claim 1,
wherein the at least one facilitating portion comprises at least one first facilitating portion and at least one second facilitating portion; and
the at least one first facilitating portion comprises the projection that is unitarily disposed with a surface of the flange which adjoins the recess,
the at least one second facilitating portion comprises at least a part of the flange that is disposed in a radial length along which the sealing member moves when the sealing member is mounted erroneously, and
the at least one first facilitating portion is disposed at a position substantially the same as the at least one second facilitating portion in the circumferential direction of the flange.

6. The oil filter according to claim 5,
wherein the at least one second facilitating portion comprises second facilitating portions that are disposed at a plurality of circumferential places substantially in symmetrical relation with respect to the center axis of the oil filter.

7. The oil filter according to claim 5,
wherein the at least one second facilitating portion is a flat surface parallel to the center axis of the oil filter on an outside surface of the flange in a radial direction of the cap.

8. The oil filter according to claim 1,
wherein the flange and the recess are spaced away from each other in an axial direction of the oil filter.

* * * * *